United States Patent
Bandi et al.

(10) Patent No.: US 10,904,113 B2
(45) Date of Patent: Jan. 26, 2021

(54) INSIGHT RANKING BASED ON DETECTED TIME-SERIES CHANGES

(71) Applicant: Microsoft Technology Licensing, LLC, Redmond, WA (US)

(72) Inventors: Aditya Bandi, Sammamish, WA (US); Ishani Shailesh Parikh, Bellevue, WA (US); Laurent Visconti, Bainbridge Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 16/177,014

(22) Filed: Oct. 31, 2018

(65) Prior Publication Data
US 2019/0394102 A1    Dec. 26, 2019

Related U.S. Application Data

(60) Provisional application No. 62/690,077, filed on Jun. 26, 2018.

(51) Int. Cl.
*H04L 12/26*    (2006.01)
*G06F 17/18*    (2006.01)

(52) U.S. Cl.
CPC ........... *H04L 43/04* (2013.01); *G06F 17/18* (2013.01); *H04L 43/0817* (2013.01); *H04L 43/0894* (2013.01)

(58) Field of Classification Search
CPC ...... G06F 17/18; G06F 11/3452; H04L 43/04; H04L 43/0817; H04L 43/0894; G06K 9/0053; G06K 9/00
See application file for complete search history.

(56) References Cited

U.S. PATENT DOCUMENTS

2015/0269050 A1    9/2015   Filimonov et al.
2016/0147585 A1    5/2016   Konig et al.
(Continued)

OTHER PUBLICATIONS

"Anomaly Detection", https://docs.microsoft.com/en-us/azure/machine-learning/studio-module-reference/anomaly-detection, Jan. 11, 2018, 3 Pages.

(Continued)

*Primary Examiner* — Oanh Duong
(74) *Attorney, Agent, or Firm* — Fiala & Weaver P.L.L.C.

(57) ABSTRACT

Techniques are provided for ranking time-series including previously detected anomalous fact quantity changes over an associated time interval. Time-series are received, and for each time-series, a normalized fact quantity change is determined, and each time-series is ranked based in part on the normalized fact quantity change. A normalized fact quantity change may be determined by determining a normalization factor over the time interval, and then determining a product of the normalization factor and the absolute value of the fact quantity change of that time interval. Alternatively, a normalized fact quantity change may be the product of the normalization factor, a predetermined order factor, and the absolute value of the fact quantity change. The normalization factor is determined by analyzing the distribution of the fact quantity change over dimension values of the dimension(s) associated with the time-series to determine the number of values in which the fact quantity is concentrated.

20 Claims, 4 Drawing Sheets

(56) References Cited

U.S. PATENT DOCUMENTS

| | | | | |
|---|---|---|---|---|
| 2016/0371170 | A1* | 12/2016 | Salunke | G06F 11/3608 |
| 2017/0076202 | A1 | 3/2017 | George et al. | |
| 2017/0116319 | A1* | 4/2017 | Zhou | G06F 17/18 |
| 2017/0192872 | A1 | 7/2017 | Awad et al. | |
| 2017/0249763 | A1* | 8/2017 | Garvey | G06Q 10/0631 |
| 2018/0106609 | A1* | 4/2018 | Imai | G01B 11/16 |
| 2018/0121163 | A1* | 5/2018 | Takeuchi | G06F 16/00 |
| 2018/0324199 | A1* | 11/2018 | Crotinger | G06F 16/248 |
| 2019/0012319 | A1* | 1/2019 | Zhu | G06F 16/248 |
| 2019/0028501 | A1* | 1/2019 | Choudhary | H04L 63/1425 |
| 2019/0179296 | A1* | 6/2019 | Imamura | G05B 23/0221 |
| 2019/0204818 | A1* | 7/2019 | Ogata | G05B 23/0283 |
| 2019/0272470 | A1 | 9/2019 | Bandi et al. | |
| 2019/0296963 | A1* | 9/2019 | Bonnell | G06F 11/3466 |
| 2019/0362245 | A1* | 11/2019 | Buda | G06K 9/00 |
| 2020/0042556 | A1* | 2/2020 | Hayashi | G06K 9/6267 |
| 2020/0104774 | A1* | 4/2020 | Sun | G06F 17/18 |
| 2020/0151199 | A1* | 5/2020 | Nakamura | G05B 23/0235 |

OTHER PUBLICATIONS

"Time Series Anomaly Detection", https://docs.microsoft.com/en-us/azure/machine-learning/studio-module-reference/time-series-anomaly-detection, Jan. 17, 2018, 11 Pages.

"International Search Report and Written Opinion Issued in PCT Application No. PCT/US2019/037566", dated Nov. 22, 2019, 12 Pages.

* cited by examiner

Receiving a plurality of time series, each time series corresponding to at least one dimension of a set of dimensions and including anomalous fact quantity changes detected over an associated time interval for a fact quanity.

304

Determining a normalized fact quantity change for each of the plurality of time series to determine a plurality of normalized fact quantity changes.

306

Assigning a rank to each of the plurality of time series based at least in part on the determined normalized fact quantity changes.

Determining a normalization factor over the associated time interval.

404

Determining a product of the normalization factor and an absolute value of the fact quantity change over the associated interval.

Analyzing a distribution of the fact quantity amongst the dimension values of the at least one dimension corresponding to the time series to determine a number of dimension values in which the fact quantity is concentrated, the determined number being the determined normalization factor.

INSIGHT RANKING BASED ON DETECTED TIME-SERIES CHANGES

CROSS-REFERENCE TO RELATED APPLICATIONS

This application claims priority to U.S. Provisional Patent Application No. 62/690,077, filed Jun. 26, 2018, titled "Insight Ranking Based on Detected Time Series Changes," the entirety of which is incorporated by reference herein.

BACKGROUND

Cloud-based application platforms have become an invaluable tool for rapidly deploying web-based applications in an extremely scalable and cost-efficient manner. Indeed, organizations are increasingly deploying more and more applications (and even different versions of those applications) in the cloud that can lead to significant administrative burdens that test the organization's ability to prioritize activities. For example, performance metrics for such cloud-based applications may be tracked and reported upon. Decisions may be made about application and/or system performance issues that may be discovered by analysis of such performance metrics.

Application performance may be based on any number of tracked and reported metrics related to, for example, performance changes, failures, application behaviors, usage patterns, and crashes. Collected application performance data may be transformed into one or more time-series for further analysis, such that data corresponding to each metric (or combination of metrics) may be plotted against time and analyzed. Analysis of performance data may include the automatic detection of anomalies in such time-series. An anomaly is any performance characteristic that differs from expectations. For example, suppose that an application typically experiences five application crashes per day across all deployed instances. Further suppose that the crash rate increases to 15 crashes per day. The sudden change in fact quantity (e.g., number of crashes) may be considered an anomaly. When anomalies are detected in the application performance time-series, reports may be generated that flag thm for further analysis or action by software development personnel. These reported application anomalies are sometimes referred to as application insights.

Large-scale cloud-based deployment of applications (and especially where a number of different applications are deployed) may end up generating extraordinarily large amounts of application performance data and related time-series. Even with automated anomaly detection, a substantial number of application insights may be generated to the point where it becomes difficult or impossible for development personnel to determine which application insight or insights ought to be prioritized over others.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems and computer program products are described herein that enable the ranking of application insights. Each insight may be found in time-series that include previously detected anomalous fact quantity changes over an associated time interval, with each time-series corresponding to one or more dimensions (or "features"). Such time-series are received, and for each time-series, a normalized fact quantity change is determined. Each time-series is ranked based in part on the determined normalized fact quantity change. In an embodiment, a normalized fact quantity change may be determined by determining a normalization factor over the time interval of the associated anomalous fact quantity changes, and then determining a product of the normalization factor and the absolute value of the fact quantity change of that time interval.

Embodiments may determine a normalization factor by analyzing the distribution of the fact quantity change amongst the dimension values of the dimension(s) associated with the time-series to determine the number of values (i.e., the normalization factor) in which significant fact quantity is concentrated. Embodiments may perform such analysis by, for example, plotting a histogram of dimension values bucketed according to a magnitude of fact quantities associated with each dimension value, identifying a tail portion of the histogram, and determining a number of dimension values (i.e., the normalization factor) included in the tail portion.

In another embodiment, the normalized fact quantity change may be determined by first assigning an order factor to each dimension(s) associated with respective time-series, and determining a product (i.e., the normalized fact quantity change) of the absolute value of a fact quantity change over the associated time interval, the normalization factor, and the order factor. In an embodiment, a time-series may be assigned a rank that is proportional to its determined normalized fact quantity change.

Further features and advantages of the invention, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Time series data is a sequence of data points indexed in time order, typically captured at equally-spaced time intervals. Time series data may be captured in any type of system, and for any type of metric that varies over time, including stock exchange stock values, temperatures, population size, the number of sunspots, error counts, etc. In one example, time series data can be used to monitor the behavior and ensure resiliency of a cloud software service/system. For instance, time series data may be captured to determine and analyze various cloud service metrics over time, such as service errors, downtime, packet errors, etc. The time series data may include captured data corresponding to numerous cloud service attributes, such as data center ID (identifier), server ID, request rates, response times, failure rates, exceptions, crashes, page views, page load performance, AJAX (asynchronous JavaScript and XML (extensible markup language)) call rates, AJAX response times, AJAX failure rates, user count, session count, CPU (central processing unit) load, response latency, memory consumption, network bandwidth, failure identifiers, market identifiers, version numbers, server machine performance counters, etc., where each attribute has multiple possible values (e.g., data center #972, data center #973, error code 100, error code 101, etc.), with which the time series data may be correlated. Such attributes may be referred to as "dimensions," and the time series data set itself may be referred to as a multi-dimensional time series. A multi-dimensional time series can be visualized as multiple two-dimensional time series, where each time series represents the same metric, but for different system attributes (dimensions). A single time series may also be based on more than a single dimension by employing various cardinality reduction strategies as known in the art.

Time series data may be analyzed to determine "anomalies." One type of anomaly may comprise, for example, dimension data points having values that deviate substantially from the values of the majority of the time series data points. This is not, however, always the case. In certain cases, a "normal" time series may include data point values that deviate substantially from the majority of other data points, or nearby data points. For example, an electrocardiogram ("EKG") may be represented as a time series of discrete data points sampled over time, and the peaks and valleys of the EKG plot comprise data points that deviate substantially from most other data points. Of course, such time series may nevertheless contain or reflect anomalies. For example, an anomaly may also comprise a series of data points that, when taken together, constitute a deviation from historical norms (e.g., deviations from normal operation of the human heart as reflected by a "normal" EKG signal).

Anomalies in time series data may correspond to performance issues (e.g., a particular server having a substantially greater number of errors than other servers in a data center) for potential correction. An example system where anomaly detection is useful is a distributed software services system, where many components run tasks independently, but may appear to end users as a single service. Such distributed services generate a large amount of logs/metrics, which can be converted to time series in which anomalies can be detected to monitor the behavior of the service and ensure resiliency of the service. Such a distributed service may include a large number of servers, applications, tenants, etc., which can each be considered a dimension against which anomalies may be desired to be correlated.

Thus, analysis of time series data, including the correlating of anomalies to particular dimensions and dimension values, is useful in detecting and correcting performance issues. A problem with multi-dimensional time series is cardinality. The number of dimensions and their possible values, can be very large, such as thousands of dimensions and/or thousands of corresponding dimension values, leading to a great deal of time-consuming analysis being performed. Accordingly, automated methods of time series anomaly detection have been developed. Even with the assistance of such automated methods, however, it may be difficult to determine how to prioritize troubleshooting of such detected anomalies.

Accordingly, example embodiments described herein are directed to techniques that enable ranking detected anomalies in operational and performance metrics (e.g., error count, user traffic, central processing unit (CPU) usage) of a cloud software service by employing a normalization technique to time series including anomalies over an associated time interval to make fact quantities associated with each time series. more directly comparable.

As used herein, the term "time series" broadly refers to a chronologically ordered sequence of data points. Time-series data can be visually represented as a two-dimensional graph. For example, a line graph may plot values of a metric against time, where time is represented on a horizontal axis (e.g., x-axis) and potential values of the metric are represented on a vertical axis (e.g., y-axis). Further, as used herein, the term "anomaly" broadly refers to a deviation of a metric from standard, normal, or expected behavior. An anomaly in time-series data may be observed as a spike, a dip, or a persistent spike or dip in a line graph, etc.

Additionally, as used herein, the term "dimension" broadly refers to the general category or type of data the time-series data reflects (i.e., CPU utilization) and "dimension value" broadly refers to the particular value of the time series at a particular instant in time (e.g., 34% CPU utilization at time t). By way of further example, in a cloud software service context, a dimension of time-series data may be "Datacenter" and dimension values of the Datacenter dimension may include the locations, names, assigned code values, etc. of datacenters in which a service is distributed across. As another example, a dimension of time-series data may be "Tenants" and the dimension values of the tenant dimension may include the names of entities or organizations that use an application provided by a service.

Additionally, as used herein, the term "fact quantity" broadly refers to the number of dimension values that comprise anomalies detected in the time series over a pre-determined time interval. For example, consider a time series or set of time series that includes a time series dimension of the crash count for an application over the last week. The raw number or count of dimension values indicative of such crashes over the last week comprise the "fact quantity" associated with crash count over the last week.

Note that as described above embodiments are applicable to any type of system in which time series may be generated. One example system is a "cloud" application or service in a network architecture/platform. A cloud platform includes a networked set of computing resources, including servers, routers, etc., that are configurable, shareable, provide data security, and are accessible over a network such as the Internet. Cloud applications run on the resources, often atop operating systems that run on the resources, for entities that access the applications over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

A multi-dimensional time series can be visually depicted as several two-dimensional time-series, where each time series represents the same metric over intervals of time but for different combinations of dimension values. For example, several time series can be used to monitor CPU usage of machines in a software service distributed across different machines. In this scenario, each machine running tasks for the service will have a time series indicating CPU usage at discrete points in time. Alternatively, a machine running two or more applications provided by service may have a time series indicating CPU usage for each application running on the machine. Any anomaly in CPU usage for a machine is observable in a line graph of CPU usage versus time as a spike or a dip. The data points of the time series of the multiple dimensions can be combined to form the multi-dimensional time series collectively. Example embodiments are described in detail herein below.

Figure 1:
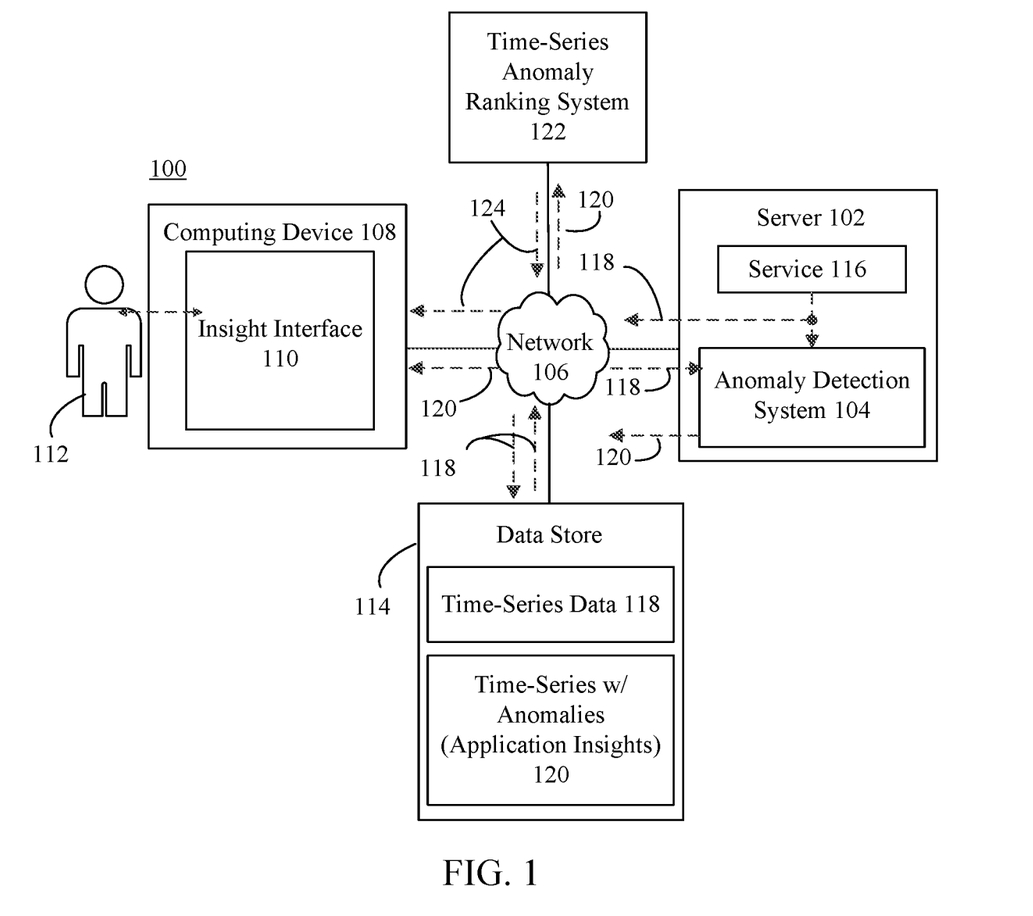
FIG. 1 is a block diagram of an example anomaly detection and ranking system that detects anomalies in time-series data, and ranks such detected anomalies, according to an example embodiment.

Embodiments may rank detected anomalies in time-series data, and may do so in various ways. For example, FIG. 1 shows a block diagram of an example anomaly detection and ranking system 100 that detects anomalies in time-series data, and ranks such detected anomalies, according to an example embodiment. Other structural and operational embodiments will be apparent to persons killed in the relevant art(s) based on the following discussion regarding anomaly detection and ranking system 100.

Anomaly detection ranking system 100 includes server 102, computing device 108, data store 114, and time-series anomaly ranking system 122. A network 106 communicatively coupled server 102, computing device 108, data store 114, and time-series anomaly ranking system 122. Server 102 includes an anomaly detections system 104 and a service 116, and computing device 108 includes an insight interface 110. System 100 is described in further detail as follows.

Server 102 may include one or more server devices and/or other computing devices. Computing device 108 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Data store 114 may include one or more of any type of storage mechanism for storing data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Server 102, computing device 108 and time-series anomaly ranking system 122 may each include at least one wired or wireless network interface that enables communication with each other and data store 114 (or an intermediate device, such as a Web server or database server) via network 106. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 106 include a local area network (LAN), a wide area network (WAN), a personal area network (PAN), and/or a combination of communication networks, such as the Internet.

Service 116 in server 102 may comprise any type of network-accessible service that provides one or more applications to end users, such as a cloud-based application hosting platform, database service, social networking service, messaging service, financial services service, news service, search service, productivity service, cloud storage and/or file hosting service, music streaming service, travel booking service, or the like. Examples of such services include but are by no means limited to a web-accessible SQL (structured query language) database, Salesforce.com™, Facebook®, Twitter®, Instagram®, Yammer®, LinkedIn®, Yahoo!® Finance, The New York Times® (at www.nytimes.com), Google™ search, Microsoft® Bing®, Google Docs™, Microsoft® Office 365, Dropbox®, Pandora® Internet Radio, National Public Radio®, Priceline.com®, etc. Although FIG. 1 shows service 116 and anomaly detection system 104 both located in server 102, in other embodiments, service 116 and anomaly detection system 104 may be located in different, separate servers.

Anomaly detection system 104 is configured to receive and analyze time-series data 118 for anomalies. For example, anomaly detection system 104 may receive time-series data 118 collected for or by service 116 directly from service 116 and/or from data store 114 via network 106. Time-series data 118 may be collected during execution of service 116 and stored remotely in data store 114 and/or locally in memory of server 102. Time-series data 118 may include operational and performance metrics for service 116. Alternatively, anomaly detection system 104 may be configured to receive data for service 116 that needs to be converted to time-series data 118 and to convert the received data to time-series data 118.

Anomaly detection system 104 is configured to select a detection technique from a plurality of detection techniques for detecting an anomaly in time-series data 118 and to apply the selected detection technique to time-series data 118 to detect an anomaly. For example, anomaly detection system 104 may divide time-series data 118 into multiple portions, where a first portion is the time-series data captured during an earlier time period ("historical data") and a second portion is the time-series data captured in a recent time period that includes being captured in real-time ("current data"). The first portion is used as historical data. Based on the characteristics of the historical data, a detection technique is selected. The second portion may then be analyzed and/or compared to the first portion of time-series data 118 according to the selected detection technique to detect an anomaly in the real-time or current data. After detecting anomalies in time-series data 118, anomaly detection system 104 is configured to transfer the time-series with anomalies (i.e., "application insights") 120 to time-series anomaly ranking system 122, computing device 108 and/or data store 114. As discussed in more detail below, time-series anomaly ranking system 122 is operable to determine priority ranking for each application insight 120.

In embodiments, one or more service owners may be enabled to interact with anomaly detection system 104 and/or time-series anomaly ranking system 122. For example, a user 112, such as an owner, administrator or application developer of service 116 or other user, may interact with anomaly detection system 104 or time-series anomaly ranking system 122 over network 106 via insight interface 110 at computing device 108. User 112 may instruct anomaly detection system 104 to provide unranked application insights 120 manual analysis, to query data store 114 for time-series data 118 or previously stored application insights 120, and/or request or review ranked time series (i.e., application insights) 124 generated by time-series anomaly ranking system 122. Insight interface 110 may include any number of user interface elements/controls (e.g., graphical user interface (GUI)), including buttons, keyboards, keypads, touchpads, menus, text boxes, check boxes, etc. for inputting instructions or configurations for anomaly detection system 104. Insight interface 110 may be implemented in a web browser (e.g., as a web page), as a desktop application, as a mobile application (e.g., an app), or in any other suitable form.

Note that although FIG. 1 shows anomaly detection system 104, time-series anomaly ranking system 122, insight interface 110, and data store 114 as separate components, in another embodiment, such components may be incorporated together into one or more other components (e.g., computing device 108 or server 102).

Figure 2:
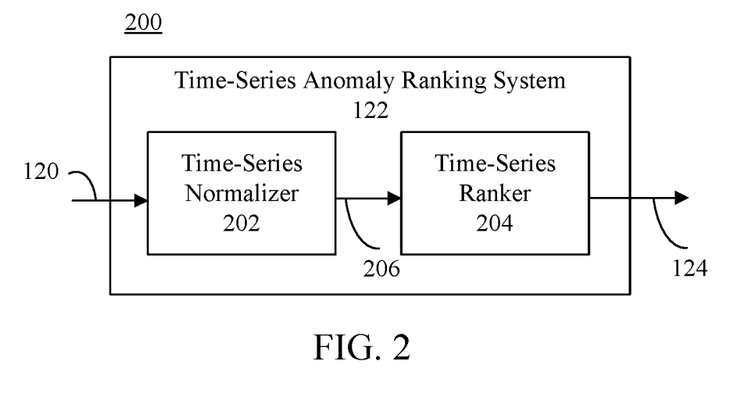
FIG. 2 is a block diagram of a time-series anomaly ranking system, according to an example embodiment.

Time-series anomaly ranking system 122 as shown in FIG. 1 may be configured in various ways to perform its functions. For instance, FIG. 2 shows a block diagram of time-series anomaly ranking system 122 incorporated in a system 200, according to an example embodiment. FIG. 2 is described with continued reference to FIG. 1. As shown in FIG. 2, time-series anomaly ranking system 122 includes a time-series normalizer 202 communicatively coupled to a time-series ranker 204. The features of system 200 are described in further detail as follows.

As shown in FIG. 2, time-series normalizer 202 is configured to receive time-series with anomalies 120, each including anomalous fact quantity changes over an associated time interval, and each time series corresponding to one or more dimensions. In an embodiment, time series normalizer 202 is configured to determine a normalized fact quantity change for each time series such that the time series may be meaningfully compared. Normalized fact quantity changes 206 for each time series are provided to time series ranker 204 to perform such comparison of the time series, and assign a rank to each series thereby determining ranked time series 124. Ranked time series 124 may thereafter be provided to, for example, insight interface 110 of computing device 108, or data store 114 for storage.

Figure 3:
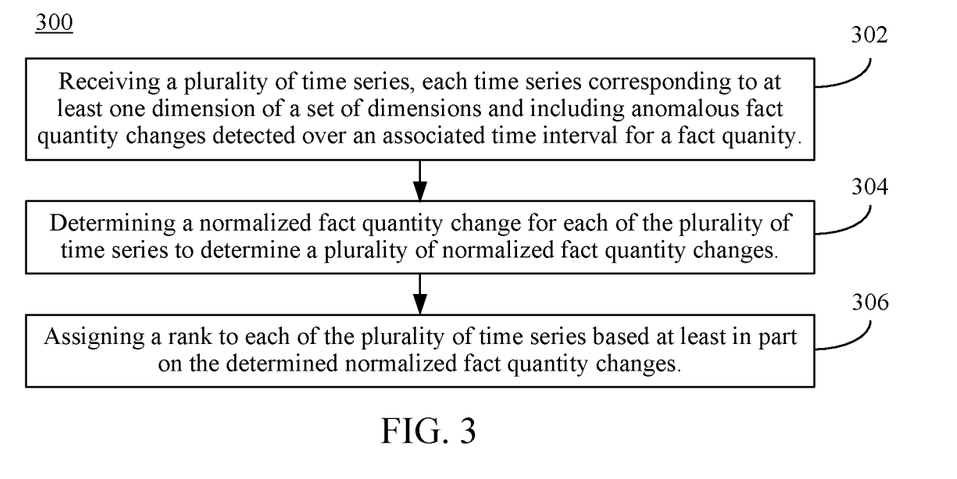
FIG. 3 depicts a flowchart of a method for ranking time-series including anomalous fact quantity changes, according to an example embodiment.

Time-series anomaly ranking system 122 may operate in various ways to perform its functions. For instance, FIG. 3 depicts a flowchart 300 of a method for ranking time-series including anomalous fact quantity changes, according to an example embodiment. FIG. 3 is described with continued reference to FIGS. 1 and 2. However, other structural and operational embodiments will be apparent to persons skilled in the relevant art(s) based on the following discussion regarding flowchart 300 and systems 100 and 200 of FIGS. 1 and 2.

As shown in FIG. 3, flowchart 300 begins at step 302. In step 302, a plurality of time series is received, each received time series corresponding to at least one dimension of a set of dimensions and including anomalous fact quantity changes detected over an associated time interval for a fact quantity. For example, and with continued reference to FIGS. 1 and 2, time series normalizer 202 of time series anomaly ranking system 122 may receive time series with anomalies 120 (unranked). As described above, each of time series with anomalies 120 corresponds to at least one dimension of a set of dimensions, and includes anomalous fact quantity changes previously detected over an associated time interval.

In step 304, a normalized fact quantity change for each of the plurality of time series is determined to determine a plurality of normalized fact quantity changes. For example, and with continued reference to FIGS. 1 and 2, time series normalizer 202 may be configured to determine a normalized fact quantity change 206 for each of time series with anomalies 120, according to an embodiment, and provide the determined changes to time series ranker 204 as normalized fact quantity changes 206. Time series normalizer 202 may determine a normalized fact quantity change 206 in various ways as will be discussed more herein below.

Flowchart 300 of FIG. 3 continues at step 306. In step 306, each of the plurality of time series is assigned a rank based at least in part on the determined normalized fact quantity changes. For example, and with continued reference to FIGS. 1 and 2, time series ranker 204 of time series anomaly ranking system 122 is configured to receive normalized fact quantity changes 206 associated with each time series, and assign a rank to each time series based in least in part on normalized fact quantity changes 206. As discussed more fully herein below, the rank assigned may be based on a numeric comparison of normalized fact quantity changes 206.

Figure 4:
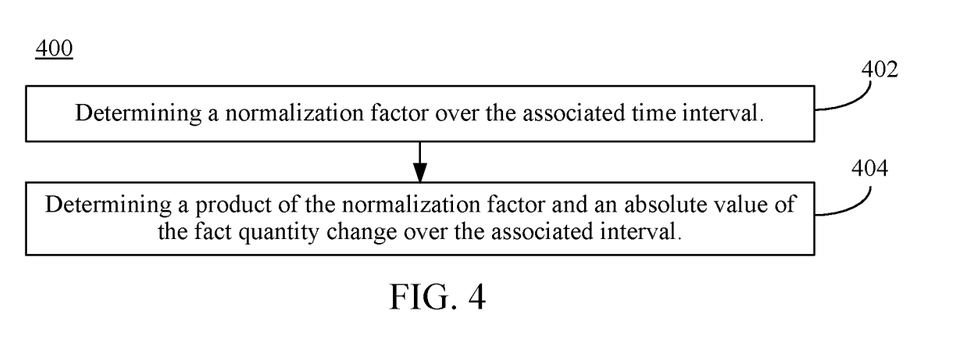
FIG. 4 depicts a flowchart of a method for determining a normalized fact quantity change for time-series including anomalous fact quantity changes, according to an embodiment.

Embodiments may determine a normalized fact quantity change for each of the plurality of time series at step 304 of flowchart 300 of FIG. 3 in various ways. For example, FIG. 4 depicts a flowchart 400 of a method for determining a normalized fact quantity change for time-series including anomalous fact quantity changes, according to an embodiment. In an embodiment, time-series anomaly ranking system 122, or time-series normalizer 202, may perform flowchart 400. FIG. 4 is described with continued reference to FIGS. 1 and 2, and 3. However, other structural and operational embodiments will be apparent to persons skilled in the relevant art(s) based on the following discussion regarding flowchart 400 and systems 100, 200, and flowchart 300 of FIGS. 1, 2, and 3.

As shown in FIG. 4, flowchart 400 begins at step 402. In step 402, a normalization factor over an associated time interval is determined. As described above in relation to step 304 of flowchart 300, embodiments of time-series normalizer 202 may be configured to, for each time series, determine a normalization factor for the time-series over the associated time interval. A normalization factor is a determined proportionality constant that, when applied to fact quantity changes associated with each time series, render such fact quantity changes directly comparable.

For example, suppose that X represents the FailureID as a dimension or feature. Each dimension value of the FailureID dimension is just a different failure identifier (e.g., error number) associated with a fact quantity (e.g., crash count) over a time interval. Further suppose that Y represents the MarketID as a dimension or feature, wherein each dimension value of MarketID is the market associated with the same fact quantity (i.e., crash count), over the same time interval. Lastly, assume that T(X) is the time series constructed based on a pivot around FailureID and T(Y) is the time series based on a pivot around MarketID. In this example, the fact quantity Q (i.e., crash count) for each time series is the same. However, the number of possible dimension values available for each dimension may be larger or smaller. For example, there may be only 375 possible markets (i.e., MarketIDs) for a particular set of time series, but perhaps 100,000 different FailureIDs. The total fact quantity (e.g., crash count) Q over the time interval will be distributed among these 375 markets and 100,000 FailureIDs. The result of this is that the total number of fact quantity (e.g., crashes) associated with the average failureID, as well as the rate of change of fact quantity, will be smaller than that associated with MarketID. For this reason, it may not be easily possible to directly compare fact quantity changes across multiple dimensions without first normalizing the fact quantity changes to account for this disparity in the number of possible dimension values.

Embodiments may determine a normalization factor for each time series over an associated time interval in various ways. For example, and as will be discussed in more detail below, flowcharts 500 and 600 of FIGS. 5 and 6 depict methods for determining normalization factors for a time series.

Flowchart 400 continues at step 404. At step 404, a product of the normalization factor and an absolute value of the fact quantity change over the associated interval is determined. For example, time-series normalizer 202 may, using the normalization factor determine for each time series, determine a product of the normalization factor and the fact quantity change for the time-series over the associated time interval. As discussed above, by applying the normalization factor determined for each time series to the anomalous fact quantity changes associated with each time series, each time series may then be compared to determine a relative ranking at, for example, step 306 of flowchart 300 of FIG. 3.

Embodiments may determine a normalization factor for each time series over an associated time interval in various ways. For example, FIG. 5 depicts a flowchart 500 of a method for determining a normalization factor by analyzing fact quantity distributions for time-series over time intervals that include anomalous fact quantity changes, according to an embodiment. In an embodiment, time-series anomaly ranking system 122, or time-series normalizer 202, may perform flowchart 500. FIG. 5 is described with continued reference to FIGS. 1-4. However, other structural and operational embodiments will be apparent to persons skilled in the relevant art(s) based on the following discussion regarding flowchart 500 and systems 100 and 200 of FIGS. 1 and 2, respectively, and flowcharts 300 and 400 of FIGS. 3 and 4, respectively.

Figure 5:
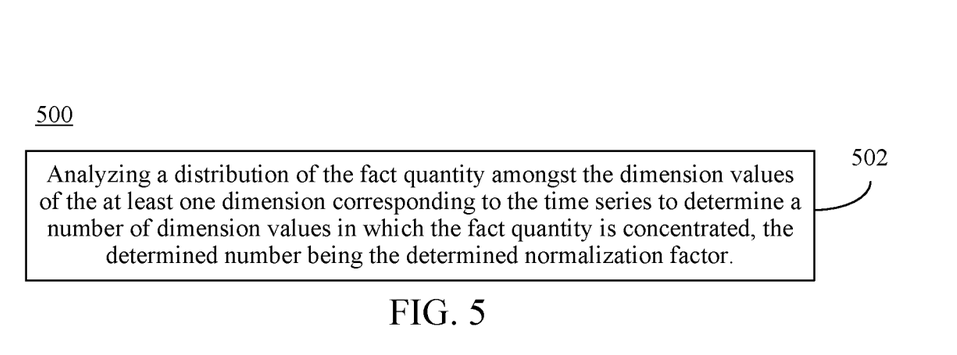
FIG. 5 depicts a flowchart of a method for determining a normalization factor by analyzing fact quantity distributions for time-series over time intervals that include anomalous fact quantity changes, according to an embodiment.
Figure 6:
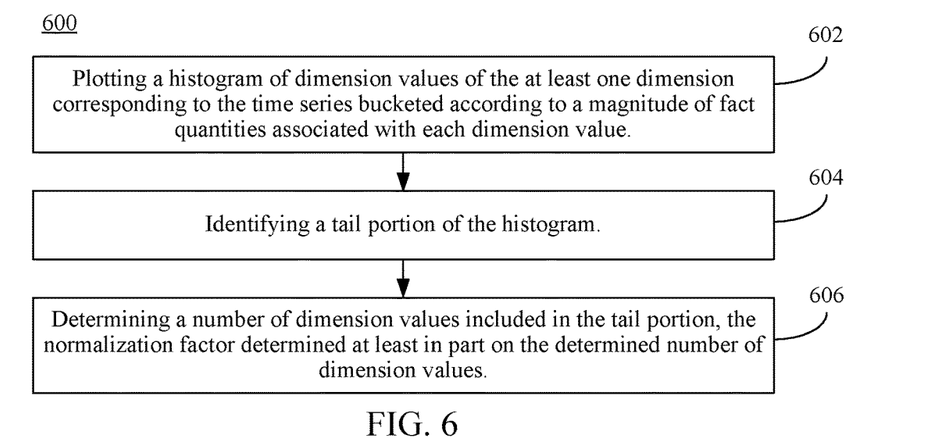
FIG. 6 depicts a flowchart of a method for analyzing fact quantity distributions, according to an embodiment.

As shown in FIG. 5, flowchart 500 begins at step 502. In step 502, a distribution of the fact quantity amongst the dimension values of the at least one dimension corresponding to the time series is analyzed to determine a number of dimension values in which significant fact quantity is concentrated, the determined number being the determined normalization factor. For example, time-series normalizer 202 of time series anomaly ranking system 122 may, for each time series, analyze the distribution of the fact quantity amongst the dimension values of the at least one dimension corresponding to the time series to determine a number of dimension values in which the significant fact quantity is concentrated.

Figure 8:
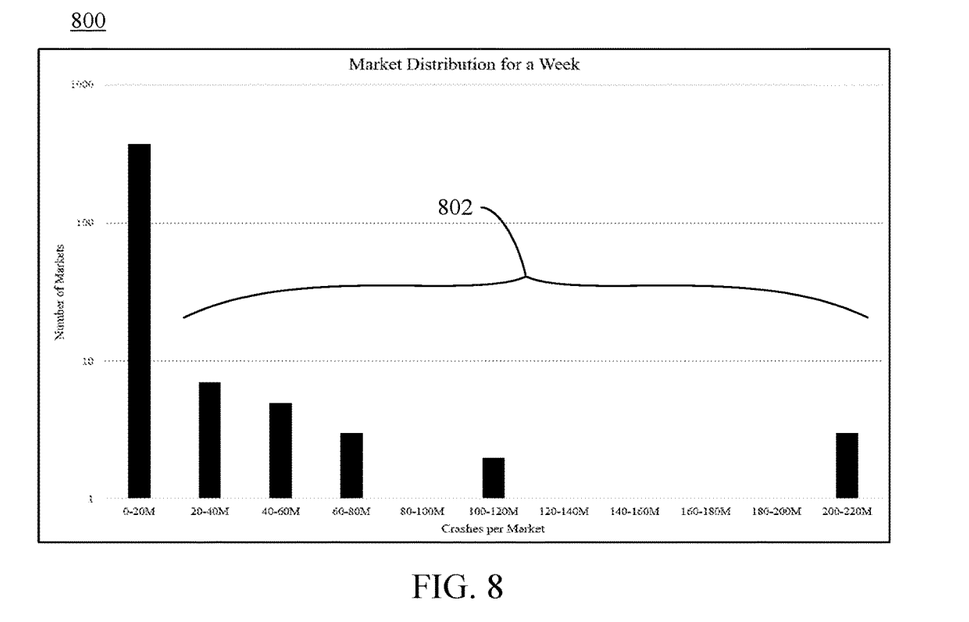
FIG. 8 shows an example histogram of fact quantity distribution for one week across a time series dimension, according to an embodiment.

For example, consider histogram 800 of FIG. 8 that depicts an example fact quantity distribution for one week across a time series dimension, according to an embodiment. In particular, histogram 800 depicts crash count (i.e., fact quantity) distribution across 395 markets (i.e., dimension values), and is constructed based on the following data assuming eleven "buckets," a histogram bucket width of 20 million crashes, and a number of markets in the eleven buckets of: {375, 7, 5, 3, 0, 2, 0, 0, 0, 0, 3}. In this example, and as is typical, the crash counts over the week are low for the majority of markets as reflected in the fact that the first bucket (leftmost in FIG. 8) containing the great majority of the markets (i.e., dimension values) has the lowest number of crashes per market (in the 0-20 million range). It ought to be noted that the first bucket also includes every market with zero crash count over the week. Assuming that these markets in fact had no crashes (or perhaps just a very low number of crashes), the fact quantity associated with these markets in the first bucket would likewise be very low, and perhaps deemed insignificant as compared to certain other buckets.

For example, note that the three markets included in the last bucket (rightmost in FIG. 8) each have between 200 and 220 million crashes each. Thus, at least these three markets (dimension values) include significant fact quantity (crash count) because the crash count for these markets is relatively high—between 600 and 660 million total crashes. As discussed below, crash counts associated with other markets may likewise be significant as determined through further analysis. Assuming that the first bucket does not include any significant fact quantity, it can be appreciated that fact quantity is concentrated over the markets included in the remaining buckets. Here, there are 20 markets over which the fact quantity is concentrated (7+5+3+0+2+3=20 markets, which does not include the 375 markets of the first bucket), indicating that the normalization factor is 20.

Embodiments may analyze the distribution of the fact quantity amongst the dimension values of the at least one dimension corresponding to the time series to determine a number of dimension values in which the significant fact quantity is concentrated in various ways. For example, FIG. 6 depicts a flowchart 600 of a method for analyzing fact quantity distributions, according to an embodiment. In an embodiment, time-series normalizer 202 may perform flowchart 600. FIG. 6 is described with continued reference to FIGS. 1-5. However, other structural and operational embodiments will be apparent to persons skilled in the relevant art(s) based on the following discussion regarding flowchart 500.

As shown in FIG. 6, flowchart 600 begins at step 602. In step 602, a histogram of dimension values of the at least one dimension corresponding to the time series is plotted, with dimension values bucketed according to a magnitude of fact quantities associated with each dimension value. For example, and with continued reference to FIG. 2 and histogram 800 of FIG. 8, time series normalizer 202 may be configured to use time series including anomalies 120 to plot a histogram of dimension values for each time series bucketed according the magnitude of fact quantity associated with each such value. In an embodiment, for example, time series normalizer 202 may create histogram 800 of FIG. 8, wherein the dimension values (i.e., markets) are bucketed according to fact quantity (i.e., crash count).

At step 604, a tail portion of the histogram is identified. For example, and with continued reference to FIGS. 2 and 8, time series normalizer 202 may be configured to identify the tail portion 802 of histogram 800 of FIG. 8. Assuming the crash count for the 375 markets included in the first bucket are not significant (since most markets included therein have zero or very few crashes), tail portion 802 of histogram 800 includes the remaining buckets of histogram 800. As known in the art, various means are available for determining tail portion 802 of the histogram 800.

At step 606, the number of dimension values included in the tail portion is determined, the normalization factor determined at least in part on the determined number of dimension values. For example, time series normalizer 202 may be configured to analyze tail portion 802 of histogram 800 to determine where the number of dimension values (i.e., markets) are included therein. Recall from discussion above that histogram 800 is plotted according to the following data (markets per crash count bucket): {375, 7, 5, 3, 0, 2, 0, 0, 0, 0, 3}. Where tail portion 802 excludes the first bucket (the bucket containing least fact quantity), the number of dimension values in the tail portion may be determined to be the sum of the remaining buckets: 7+5+3+2+3=20. Thus, by identifying the tail portion of the distribution, and summing the number of dimension values contained there, a normalization factor may be determined.

Figure 7:
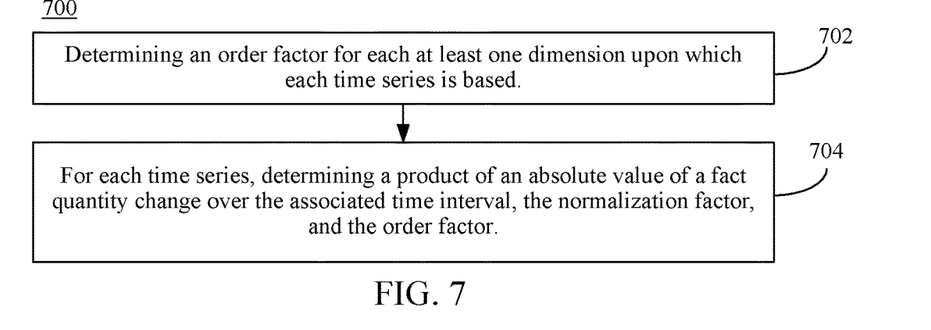
FIG. 7 depicts a flowchart of a method for determining a normalized fact quantity change based in part on a predetermined order factor, according to an embodiment.

Embodiments may determine a normalized fact quantity change of a time series including anomalous fact quantity changes over an associated time interval, and may do so in various ways. For example, FIG. 7 depicts a flowchart 700 of a method for determining a normalized fact quantity change based in part on a pre-determined order factor, according to an embodiment. In an embodiment, time-series anomaly ranking system 122, or time-series normalizer 202, may perform flowchart 700. FIG. 7 is described with continued reference to FIGS. 1-3. However, other structural and operational embodiments will be apparent to persons skilled in the relevant art(s) based on the following discussion regarding flowchart 700 and systems 100, 200, and flowchart 300 of FIGS. 1, 2, and 3.

As shown at FIG. 7, flowchart 700 begins at step 702. In step 702, an order factor is determined for each at least one dimension upon which each time series is based. In an embodiment, not all dimensions are afforded equal priority. It may be the case, for example, the fact quantity change associated with crash count ought to be given ranking priority over, for example, average CPU consumption for the same application. In such instances, for example, embodiments of time series normalizer 202 may determine or be provided with an order factor comprising a proportionality constant (scaling factor) to be associated with each dimension.

At step 704, for each time series, a product is determined of: an absolute value of a fact quantity change over the associated time interval, the normalization factor, and the order factor. For example, time series normalizer 202 may be configured to optionally use the order factor associated with each dimension as a scaling factor when computing a normalized fact quantity change for any time series reflective of that dimension.

III. Example Computer System Implementation

Time series anomaly ranking system 122, time series normalizer 202, time series ranker 204, and flowcharts 300, 400, 500, 600 and/or 700 may be implemented in hardware, or hardware combined with software and/or firmware. For example, time series anomaly ranking system 122, time series normalizer 202, time series ranker 204, and flowcharts 300-700 may be implemented as computer program code/instructions configured to be executed in one or more processors and stored in a computer readable storage medium. Alternatively, time series anomaly ranking system 122, time series normalizer 202, time series ranker 204, and flowcharts 300, 400, 500, 600 and/or 700 may be implemented as hardware logic/electrical circuitry.

For instance, in an embodiment, one or more, in any combination, of time series anomaly ranking system 122, time series normalizer 202, time series ranker 204, and/or any one or more of flowcharts 300, 400, 500, 600 and/or 700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
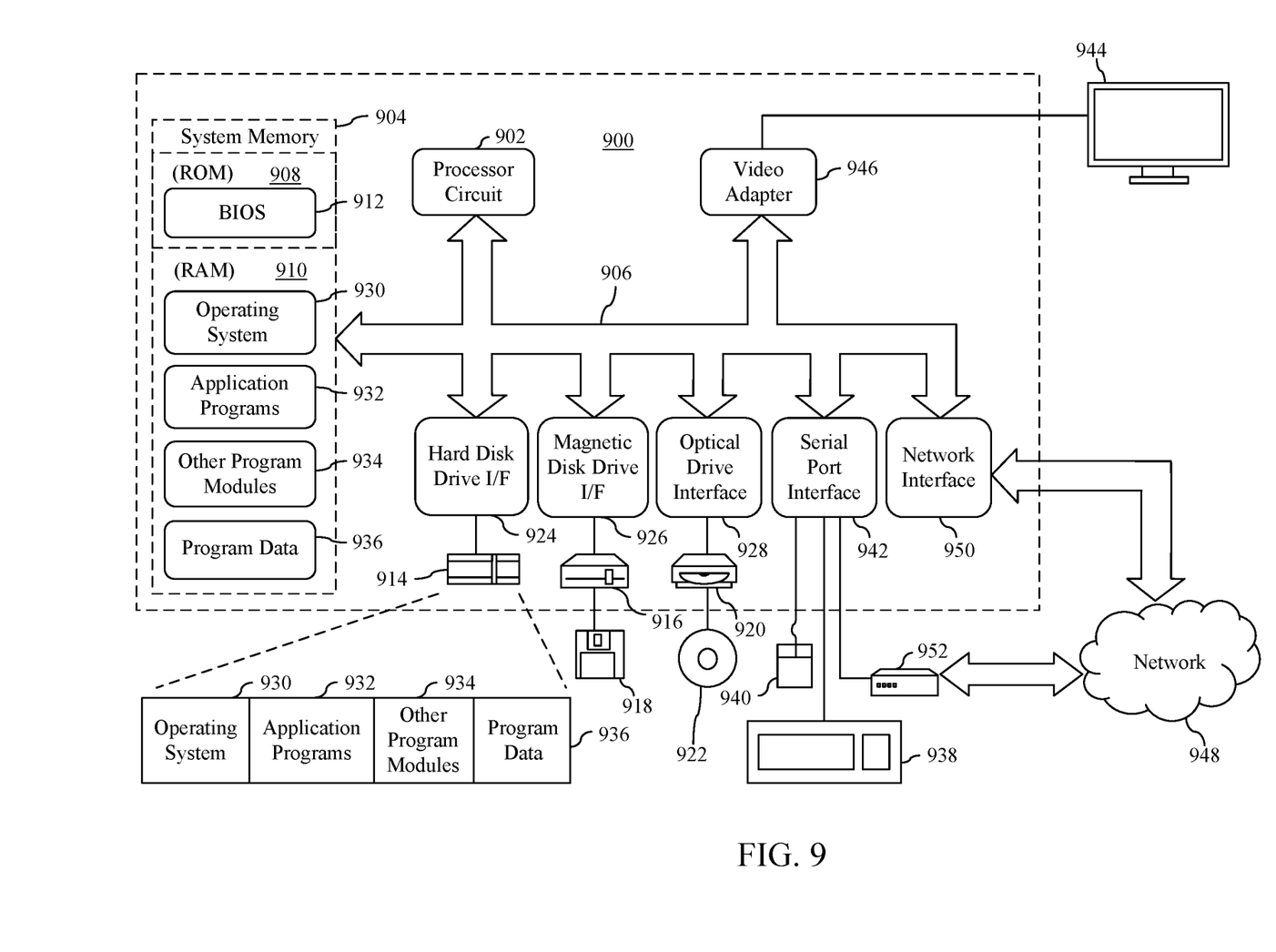
FIG. 9 is a block diagram of an example processor-based computer system that may be used to implement various embodiments.

FIG. 9 depicts an exemplary implementation of a computing device 900 in which embodiments may be implemented. For example, server 102, computing device 108, time-series anomaly ranking system 122, and/or data store 114 may each be implemented in one or more computing devices similar to computing device 800 in stationary or mobile computer embodiments, including one or more features of computing device 800 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing Time series anomaly ranking system 122, time series normalizer 202, time series ranker 204, and flowcharts 300, 400, 500, 600 and/or 700 (including any suitable step of flowcharts 300, 400, 500, 600 and/or 700), and/or further embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments described herein. Accordingly, such computer programs represent controllers of the computing device 900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method is described herein. The method includes: receiving a plurality of time-series, each time-series corresponding to at least one dimension of a set of dimensions and including anomalous fact quantity changes detected over an associated time interval for a fact quantity; determining a normalized fact quantity change for each of the plurality of time-series to determine a plurality of normalized fact quantity changes; and assigning a rank to each of the plurality of time-series based at least in part on the determined normalized fact quantity changes.

In one embodiment of the foregoing method, said determining a normalized fact quantity change for each of the plurality of time-series to determine a plurality of normalized fact quantity changes comprises, for each time-series: determining a normalization factor over the associated time interval, and determining a product of the normalization factor and an absolute value of the fact quantity change over the associated interval.

In one embodiment of the foregoing method, said determining a normalization factor over the associated time interval comprises, for each time-series: analyzing a distribution of the fact quantity amongst the dimension values of the at least one dimension corresponding to the time-series to determine a number of dimension values in which fact quantity is concentrated, the determined number being the determined normalization factor.

In one embodiment of the foregoing method, said analyzing comprises: plotting a histogram of dimension values of the at least one dimension corresponding to the time-series bucketed according to a magnitude of fact quantities associated with each dimension value; identifying a tail portion of the histogram; and determining a number of dimension values included in the tail portion, the normalization factor determined at least in part on the determined number of dimension values.

In one embodiment of the foregoing method, the method further comprises: determining an order factor for each dimension upon which each time-series is based; and wherein said determining a normalized fact quantity change for each of the plurality of time-series to determine a plurality of normalized fact quantity changes further comprises, for each time-series: determining a product of an absolute value of a fact quantity change over the associated time interval, the normalization factor, and the order factor.

In one embodiment of the foregoing method, said rank is proportional to a determined normalized fact quantity change corresponding to the time-series.

In one embodiment of the foregoing method, said set of dimensions comprises one or more of: request rates, response times, failure rates, exceptions, crashes, page views, page load performance, AJAX (asynchronous JavaScript and XML (extensible markup language)) call rates, AJAX response times, AJAX failure rates, user count, session count, CPU (central processing unit) load, response latency, memory consumption, network bandwidth, failure identifiers, market identifiers, version numbers, or server machine performance counters.

A time series anomaly ranking system is described herein. In one embodiment, the system comprises: a time-series normalizer configured to receive a plurality of time-series, each time-series corresponding to at least one dimension of a set of dimensions and including anomalous fact quantity changes detected over an associated time interval for a fact quantity, the time-series normalizer configured to determine a normalized fact quantity change for each of the plurality of time-series to determine a plurality of normalized fact quantity changes; and a time-series ranker configured to assign a rank to each of the plurality of time-series based at least in part on the determined normalized fact quantity changes.

In one embodiment of the foregoing system, the time-series normalizer is further configured to, for each time-series: determine a normalization factor over the associated time interval, and determine a product of the normalization factor and an absolute value of the fact quantity change over the associated interval.

In one embodiment of the foregoing system, the time-series normalizer is further configured to: determine a normalization factor over the associated time interval by analyzing a distribution of the fact quantity amongst the dimension values of the at least one dimension corresponding to the time-series to determine a number of dimension values in which the fact quantity is concentrated, the determined number being the determined normalization factor.

In one embodiment of the foregoing system, the time-series normalizer is configured to: plot a histogram of dimension values of the at least one dimension corresponding to the time-series bucketed according to a magnitude of fact quantities associated with each dimension value; identify a tail portion of the histogram; and determine a number of dimension values included in the tail portion, the normalization factor determined at least in part on the determined number of dimension values.

In one embodiment of the foregoing system, the time-series normalizer is further configured to: determine an order factor for each dimension upon which each time-series is based; and for each time-series, determine a product of an absolute value of a fact quantity change over the associated time interval, the normalization factor, and the order factor.

In one embodiment of the foregoing system, the rank assigned to each time-series is proportional to a determined normalized fact quantity change corresponding to the time-series.

In one embodiment of the foregoing system, the set of dimensions comprises one or more of: request rates, response times, failure rates, exceptions, crashes, page views, page load performance, AJAX (asynchronous JavaScript and XML (extensible markup language)) call rates, AJAX response times, AJAX failure rates, user count, session count, CPU (central processing unit) load, response latency, memory consumption, network bandwidth, failure identifiers, market identifiers, version numbers, or server machine performance counters.

A computer-readable memory device having computer program logic recorded thereon that when executed by at least one processor of a computing device causes the at least one processor to perform operations is described herein. In one embodiment of the computer program product, the operations comprise: receiving a plurality of time-series, each time-series corresponding to at least one dimension of a set of dimensions and including anomalous fact quantity changes detected over an associated time interval for a fact quantity; determining a normalized fact quantity change for each of the plurality of time-series to determine a plurality of normalized fact quantity changes; and assigning a rank to each of the plurality of time-series based at least in part on the determined normalized fact quantity changes.

In one embodiment of the foregoing computer-readable memory device, determining a normalized fact quantity change for each of the plurality of time-series to determine a plurality of normalized fact quantity changes comprises, for each time-series: determining a normalization factor over the associated time interval, and determining a product of the normalization factor and an absolute value of the fact quantity change over the associated interval.

In one embodiment of the foregoing computer-readable memory device, determining a normalization factor over the associated time interval comprises, for each time-series: analyzing a distribution of the fact quantity amongst the dimension values of the at least one dimension corresponding to the time-series to determine a number of dimension values in which the fact quantity is concentrated, the determined number being the determined normalization factor.

In one embodiment of the foregoing computer-readable memory device, analyzing comprises: plotting a histogram of dimension values of the at least one dimension corresponding to the time-series bucketed according to a magnitude of fact quantities associated with each dimension value; identifying a tail portion of the histogram; and determining a number of dimension values included in the tail portion, the normalization factor determined at least in part on the determined number of dimension values.

In one embodiment of the foregoing computer-readable memory device, the operations further comprise: determining an order factor for each dimension upon which each time-series is based; and wherein said determining a normalized fact quantity change for each of the plurality of time-series to determine a plurality of normalized fact quantity changes further comprises, for each time-series: determining a product of an absolute value of a fact quantity change over the associated time interval, the normalization factor, and the order factor.

In one embodiment of the foregoing computer-readable memory device, the set of dimensions comprises one or more of: request rates, response times, failure rates, exceptions, crashes, page views, page load performance, AJAX (asynchronous JavaScript and XML (extensible markup language)) call rates, AJAX response times, AJAX failure rates, user count, session count, CPU (central processing unit) load, response latency, memory consumption, network bandwidth, failure identifiers, market identifiers, version numbers, or server machine performance counters.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
receiving a plurality of time-series, each time-series corresponding to at least one dimension of a set of dimensions and including anomalous fact quantity changes detected over an associated time interval for a fact quantity;
determining a normalized fact quantity change for each of the plurality of time-series to determine a plurality of normalized fact quantity changes, said determining comprising, for each time-series:
determining a normalization factor over the associated time interval, and
determining a product of the normalization factor and an absolute value of the fact quantity change over the associated interval; and
assigning a rank to each of the plurality of time-series based at least in part on the determined normalized fact quantity changes.

2. The method of claim 1, wherein said determining a normalization factor over the associated time interval comprises, for each time-series:
analyzing a distribution of the fact quantity amongst the dimension values of the at least one dimension corresponding to the time-series to determine a number of dimension values in which fact quantity is concentrated, the determined number being the determined normalization factor.

3. The method of claim 2, wherein said analyzing comprises:
plotting a histogram of dimension values of the at least one dimension corresponding to the time-series bucketed according to a magnitude of fact quantities associated with each dimension value;
identifying a tail portion of the histogram; and
determining a number of dimension values included in the tail portion, the normalization factor determined at least in part on the determined number of dimension values.

4. The method of claim 1, further comprising:
determining an order factor for each dimension upon which each time-series is based; and
wherein said determining a normalized fact quantity change for each of the plurality of time-series to determine a plurality of normalized fact quantity changes further comprises, for each time-series:
determining a product of an absolute value of a fact quantity change over the associated time interval, the normalization factor, and the order factor.

5. The method of claim 1, wherein said rank is proportional to a determined normalized fact quantity change corresponding to the time-series.

6. The method of claim 1, wherein the set of dimensions comprises one or more of:
request rates, response times, failure rates, exceptions, crashes, page views, page load performance, AJAX (asynchronous JavaScript and XML (extensible markup language)) call rates, AJAX response times, AJAX failure rates, user count, session count, CPU (central processing unit) load, response latency, memory consumption, network bandwidth, failure identifiers, market identifiers, version numbers, or server machine performance counters.

7. The method of claim 1, wherein the received plurality of time-series comprises a multi-dimensional time series.

8. A time-series anomaly ranking system, comprising:
one or more processors; and
one or more memory devices accessible to the one or more processors, the one or more memory devices storing software components for execution by the one or more processors, the software components including:
a time-series normalizer configured to receive a plurality of time-series, each time-series corresponding to at least one dimension of a set of dimensions and including anomalous fact quantity changes detected over an associated time interval for a fact quantity, the time-series normalizer configured to determine a normalized fact quantity change for each of the plurality of time-series to determine a plurality of normalized fact quantity changes by, for each time-series:
  determining a normalization factor over the associated time interval, and
  determining a product of the normalization factor and an absolute value of the fact quantity change over the associated interval; and
a time-series ranker configured to assign a rank to each of the plurality of time-series based at least in part on the determined normalized fact quantity changes.

9. The time-series anomaly ranking system of claim 8, wherein the time-series normalizer is further configured to:
  determine a normalization factor over the associated time interval by analyzing a distribution of the fact quantity amongst the dimension values of the at least one dimension corresponding to the time-series to determine a number of dimension values in which the fact quantity is concentrated, the determined number being the determined normalization factor.

10. The time-series anomaly ranking system of claim 9, wherein the time-series normalizer is configured to:
  plot a histogram of dimension values of the at least one dimension corresponding to the time-series bucketed according to a magnitude of fact quantities associated with each dimension value;
  identify a tail portion of the histogram; and
  determine a number of dimension values included in the tail portion, the normalization factor determined at least in part on the determined number of dimension values.

11. The time-series anomaly ranking system of claim 8, wherein the time-series normalizer is further configured to:
  determine an order factor for each dimension upon which each time-series is based; and
  for each time-series, determine a product of an absolute value of a fact quantity change over the associated time interval, the normalization factor, and the order factor.

12. The time-series anomaly ranking system of claim 8, wherein the rank assigned to each time-series is proportional to a determined normalized fact quantity change corresponding to the time-series.

13. The time-series anomaly ranking system of claim 8, wherein the set of dimensions comprises one or more of:
  request rates, response times, failure rates, exceptions, crashes, page views, page load performance, AJAX (asynchronous JavaScript and XML (extensible markup language)) call rates, AJAX response times, AJAX failure rates, user count, session count, CPU (central processing unit) load, response latency, memory consumption, network bandwidth, failure identifiers, market identifiers, version numbers, or server machine performance counters.

14. The time-series anomaly ranking system of claim 8, wherein the received plurality of time-series comprises a multi-dimensional time series.

15. A computer-readable memory device having computer program logic recorded thereon that when executed by at least one processor of a computing device causes the at least one processor to perform operations, the operations comprising:
  receiving a plurality of time-series, each time-series corresponding to at least one dimension of a set of dimensions and including anomalous fact quantity changes detected over an associated time interval for a fact quantity;
  determining a normalized fact quantity change for each of the plurality of time-series to determine a plurality of normalized fact quantity changes, said determining comprising, for each time-series:
    determining a normalization factor over the associated time interval, and
    determining a product of the normalization factor and an absolute value of the fact quantity change over the associated interval; and
  assigning a rank to each of the plurality of time-series based at least in part on the determined normalized fact quantity changes.

16. The computer-readable memory device of claim 15 wherein said determining a normalization factor over the associated time interval comprises, for each time-series:
  analyzing a distribution of the fact quantity amongst the dimension values of the at least one dimension corresponding to the time-series to determine a number of dimension values in which the fact quantity is concentrated, the determined number being the determined normalization factor.

17. The computer-readable memory device of claim 16 wherein said analyzing comprises:
  plotting a histogram of dimension values of the at least one dimension corresponding to the time-series bucketed according to a magnitude of fact quantities associated with each dimension value;
  identifying a tail portion of the histogram; and
  determining a number of dimension values included in the tail portion, the normalization factor determined at least in part on the determined number of dimension values.

18. The computer-readable memory device of claim 15 the operations further comprising:
  determining an order factor for each dimension upon which each time-series is based; and
  wherein said determining a normalized fact quantity change for each of the plurality of time-series to determine a plurality of normalized fact quantity changes further comprises, for each time-series:
    determining a product of an absolute value of a fact quantity change over the associated time interval, the normalization factor, and the order factor.

19. The computer-readable memory device of claim 15, wherein the set of dimensions comprises one or more of:
  request rates, response times, failure rates, exceptions, crashes, page views, page load performance, AJAX (asynchronous JavaScript and XML (extensible markup language)) call rates, AJAX response times, AJAX failure rates, user count, session count, CPU (central processing unit) load, response latency, memory consumption, network bandwidth, failure identifiers, market identifiers, version numbers, or server machine performance counters.

20. The computer-readable memory device of claim 15, wherein the rank assigned to each time-series is proportional to the determined normalized fact quantity change corresponding to the respective time-series.

* * * * *